United States Patent
Suzuki

(10) Patent No.: US 8,022,689 B2
(45) Date of Patent: Sep. 20, 2011

(54) BATTERY CONNECTION DETECTING DEVICE AND IMAGE FORMING APPARATUS INCLUDING THE SAME

(75) Inventor: Takayuki Suzuki, Gifu-ken (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 356 days.

(21) Appl. No.: 12/412,018

(22) Filed: Mar. 26, 2009

(65) Prior Publication Data

US 2009/0267609 A1    Oct. 29, 2009

(30) Foreign Application Priority Data

Apr. 28, 2008   (JP) ................. 2008-117638

(51) Int. Cl.
*G01N 27/416* (2006.01)
*B41J 2/435* (2006.01)
(52) U.S. Cl. .......... 324/134; 324/165; 347/224
(58) Field of Classification Search .......... None
See application file for complete search history.

(56) References Cited

U.S. PATENT DOCUMENTS

| | | | | |
|---|---|---|---|---|
| 5,182,583 A | * | 1/1993 | Horigome et al. | 347/19 |
| 5,182,655 A | * | 1/1993 | Motoyanagi | 358/406 |
| 5,774,044 A | * | 6/1998 | Hayashi | 340/426.1 |
| 6,067,101 A | * | 5/2000 | Arakawa et al. | 347/19 |
| 7,746,031 B2 | * | 6/2010 | Ishishita | 320/132 |

FOREIGN PATENT DOCUMENTS

| | | |
|---|---|---|
| JP | 08-095678 | 4/1996 |
| JP | 08-214100 | 8/1996 |
| JP | 11-146571 | 5/1999 |

OTHER PUBLICATIONS

Notification of Reasons for Refusal corresponding to Japanese Patent Application No. 2008-117638 dated Sep. 2, 2010.

* cited by examiner

*Primary Examiner* — Vinh P Nguyen
(74) *Attorney, Agent, or Firm* — Banner & Witcoff, Ltd.

(57) ABSTRACT

A battery connection detecting device includes a connecting unit, to which a battery is connected, a voltage detecting unit that detects a voltage value of the connecting unit, the voltage value detected by the voltage detecting unit being a detection voltage value, a switching unit that switches supply of charging power to the battery connected to the connecting unit based on the detection voltage value, and a connection detecting unit that compares at least one predetermined voltage value with at least one of the detection voltage value before the switching unit switches the supply of the charging power and the detection voltage value after the switching unit switches the supply of the charging power in order to detect whether or not the battery is connected to the connecting unit.

13 Claims, 4 Drawing Sheets

BATTERY CONNECTION DETECTING DEVICE AND IMAGE FORMING APPARATUS INCLUDING THE SAME

CROSS-REFERENCE TO RELATED APPLICATIONS

This application claims priority from Japanese Patent Application No. 2008-117638 filed on Apr. 28, 2008, the entire subject matter of which is incorporated herein by reference.

TECHNICAL FIELD

Aspects of the invention relate to a battery connection detecting device and an image forming apparatus including the battery connection detecting device.

BACKGROUND

There has been proposed a related art technique for detecting presence or absence of attachment of a cell. For example, JP-A-08-095678 discloses a technique using a switch that is mechanically switched to an on/off state by attaching/detaching the cell so as to detect whether or not a chargeable secondary cell is attached by on/off of the switch. Then, JP-A-08-095678 uses a remaining amount detecting unit for detecting, remaining amount of the cell so as to detect whether or not an unchargeable primary cell is attached by detecting whether or not the remaining amount of the cell exceeds a predetermined amount or more. Accordingly, JP-A-08-095678 detects the presence or absence of attachment of the cell.

SUMMARY

Illustrative aspects of the invention provide a battery connection detecting device capable of detecting a connection state of a battery by a simple structure, and further provide an image forming apparatus including the battery connection detecting device.

DETAILED DESCRIPTION

General Overview

Figure 1:
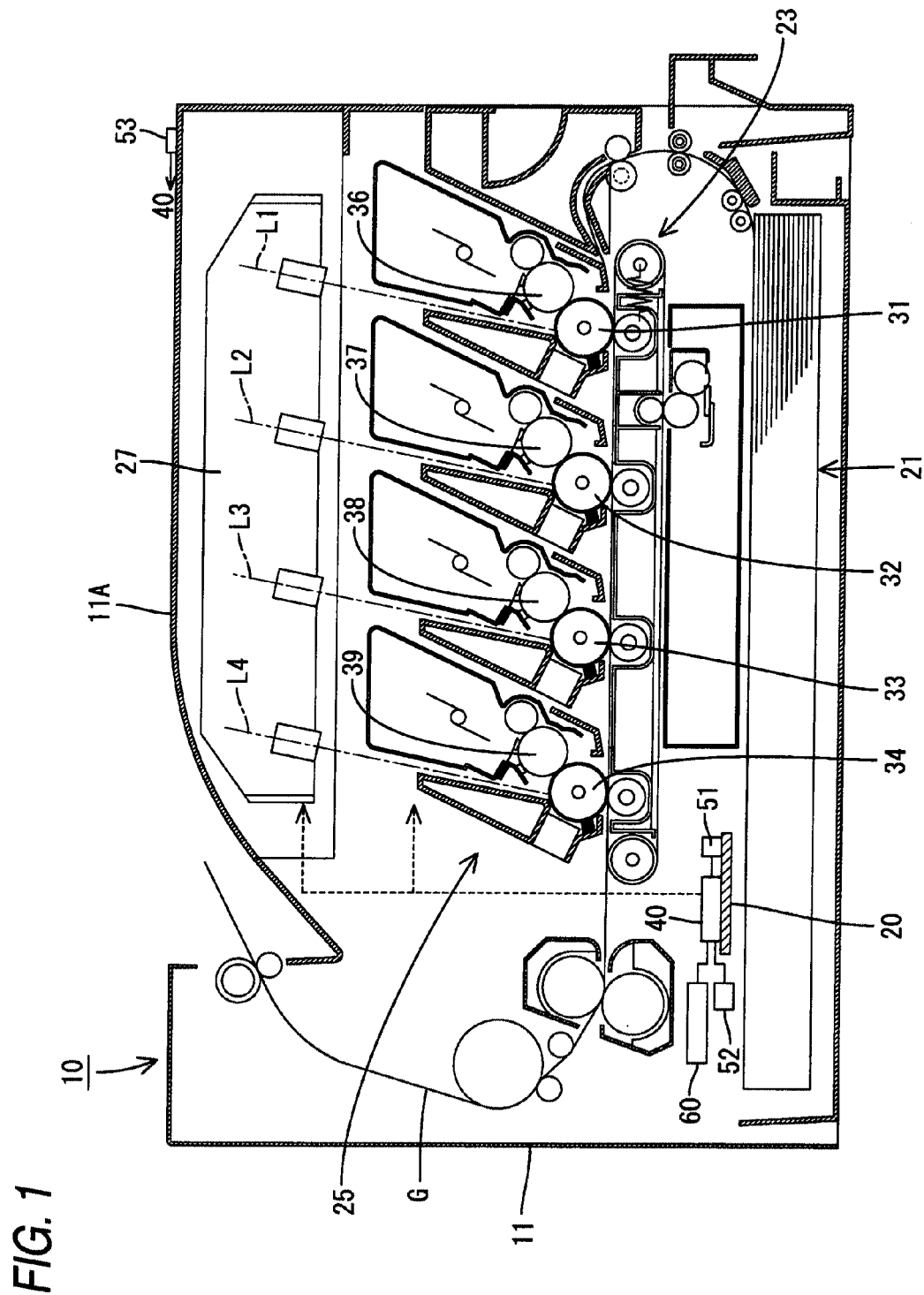
FIG. 1 is a main side sectional view of an image forming apparatus according to an exemplary embodiment of the invention.

The related art techniques described above have some disadvantages. For example, when the related art technique disclosed in JP-A-08-095678 is adopted for making a decision whether or not a battery (i.e., a secondary cell) is attached, a configuration of mechanically switching between on and off is required. Thus, the structure thereof may become complicated.

Therefore, illustrative aspects of the invention provide a battery connection detecting device capable of detecting a connection state of a battery by a simple structure, and further provide an image forming apparatus including the battery connection detecting device.

According to a first aspect of the invention, there is provided a battery connection detecting device comprising: a connecting unit, to which a battery is connected; a voltage detecting unit that detects a voltage value of the connecting unit, the voltage value detected by the voltage detecting unit being a detection voltage value; a switching unit that switches supply of charging power to the battery connected to the connecting unit based on the detection voltage value; and a connection detecting unit that compares at least one predetermined voltage value with at least one of the detection voltage value before the switching unit switches the supply of the charging power and the detection voltage value after the switching unit switches the supply of the charging power in order to detect whether or not the battery is connected to the connecting unit.

According to a second aspect of the invention, in the battery connection detecting device, wherein, when the detection voltage value at a time of supplying the charging power before the switching unit switches the supply of the charging power is less than a first predetermined voltage value, the connection detecting unit detects that the battery is connected to the connecting unit.

According to a third aspect of the invention, in the battery connection detecting device, wherein, when the detection voltage value at a time of supplying the charging power before the switching unit switches the supply of the charging power is more than or equal to a first predetermined voltage value, the switching unit stops the supply of the charging power, wherein, when the detection voltage value at a time after the supply of the charging power is stopped is more than or equal to a second predetermined voltage value, which is smaller than the first predetermined voltage value, the connection detecting unit detects that the battery is connected to the connecting unit, and wherein, when the detection voltage value at the time after the supply of the charging power is stopped is less than the second predetermined voltage value, the connection detecting unit detects that the battery is not connected to the connecting unit.

According to a fourth aspect of the invention, in the battery connection detecting device, wherein the second predetermined voltage value is set to a voltage value that is smaller than a minimum voltage value of the detection voltage value at a time when an uncharged battery is connected to the connecting unit after the supply of the charging power is stopped.

According to a fifth and a sixth aspects of the invention, in the battery connection detecting device, wherein the first predetermined voltage value is set to a value corresponding to the detection voltage value at a time of connecting a full-charged battery having a substantially constant voltage to the connecting unit.

According to a seventh aspect of the invention, in the battery connection detecting device, wherein, when the detection voltage value at a time of stopping the supply of the charging power before the switching unit switches the supply of the charging power is more than or equal to a third predetermined voltage value, the connection detecting unit detects that the battery is connected to the connecting unit.

According to an eighth aspect of the invention, in the battery connection detecting device, wherein, when the detection voltage value at a time of stopping the supply of the charging power after the switching unit switches the supply of the charging power is less than a third predetermined voltage value, the switching units starts the supply of the charging power, wherein, when the detection voltage value at a time after the supply of the charging power is started is more than or equal to a fourth predetermined voltage value, which is larger than the third predetermined voltage value, the connection detecting unit detects that the battery is not connected to the connecting unit, and wherein, when the detection voltage value at the time after the supply of the charging power is started is less than the fourth predetermined value, the connection detecting unit detects that the battery is connected to the connecting unit.

According to a ninth aspect of the invention, in the battery connection detecting device, wherein the fourth predetermined voltage value is set to a voltage value, which is smaller than a minimum voltage value of the detection voltage value at a time when the battery is not connected to the connecting unit after the supply of the charging power is started, and which is more than or equal to a predetermined voltage difference from the third predetermined voltage value.

According to a tenth and an eleventh aspects of the invention, in the battery connection detecting device, wherein the third predetermined voltage value is set to a minimum voltage value of the detection voltage value at a time of connecting an uncharged battery to the connecting unit when the supply of the charging power is stopped.

According to a twelfth aspect of the invention, in the battery connection detecting device, wherein the connection detecting unit generates a notification signal for notifying a detection result thereof.

According to a thirteenth aspect of the invention, there is provided an image forming apparatus comprising: a battery; a battery connection detecting device, which detects a connection state of the battery, and which comprises: a connecting unit, to which a battery is connected; a voltage detecting unit that detects a voltage value of the connecting unit, the voltage value detected by the voltage detecting unit being a detection voltage value; a switching unit that switches supply of charging power to the battery connected to the connecting unit based on the detection voltage value; and a connection detecting unit that compares at least one predetermined voltage value with at least one of the detection voltage value before the switching unit switches the supply of the charging power and the detection voltage value after the switching unit switches the supply of the charging power in order to detect whether or not the battery is connected to the connecting unit; a storage unit, which is connected to the battery, and which stores data related to image formation by electric power supplied from the battery; an image forming unit that forms an image on a recording medium using at least a part of the data; and a setting unit that sets a mode of executing detection processing by the battery connection detecting device.

According to the aspects of the invention, the presence or absence of connection of a battery to the battery connecting unit is simply detected based on a comparison between a voltage value of the battery connecting unit at the time of the presence or absence of the supply of the charging power to the battery switched by the switching unit, that is, a detection voltage value by the voltage detecting unit and the corresponding predetermined voltage value. According thereto, a connection state of the battery can be detected by a simple structure.

According to the second aspect, a first predetermined voltage value is set lower than, for example, a battery full charge voltage value. In this case, when a detection voltage value is less than the first predetermined voltage value, it can be decided that a charging current to a battery tends to flow and the battery which is not charged too much is connected to the connecting unit.

In the first aspect of the invention, when a detection voltage value is a first predetermined voltage value or more (a state in which a charging current resists flowing) in the case of setting the first predetermined voltage value lower than, for example, a battery full charge voltage value, disconnection of a battery or connection of a battery close to full charge can be decided, but it may not be identified whether or not the battery is connected to the connecting unit yet herein. In this regard, according to the third aspect of the invention, when the detection voltage value is more than or equal to a second predetermined value smaller than the first predetermined voltage value after a stop of the supply of charging power, it can be decided that electric power is supplied from the battery, so that it can be decided that the battery is connected. Further, when the detection voltage value is less than the second predetermined voltage value, it can be decided that the battery is absent.

According to the fourth aspect of the invention, connection and disconnection of a battery to and from the connecting unit can be decided more accurately. Here, the "minimum voltage value of a detection voltage value" is previously determined by experiment, etc.

According to the fifth and sixth aspects of the invention, it can be decided whether a battery on charging is connected or a battery is in the other states (i.e., disconnection of a battery or connection of a battery of full charge). Here, "the time of full charge in which the voltage is substantially constant" refers to the charging end time at which a change in a battery voltage with respect to charging time becomes smaller than that on charging in a charging curve of the battery.

According to the seventh aspect of the invention, for example, by setting a third predetermined voltage value at the minimum voltage value of a detection voltage value at the time of connecting an uncharged battery to the connecting unit at the time of a stop of the supply of the charging power, it can be decided that a battery charged to a certain extent is connected.

In the first aspect of the invention, when a detection voltage value is less than a third predetermined value, disconnection of a battery or connection of a battery close to uncharging can be decided, but it may not be identified whether or not the battery is connected to the connecting unit yet herein. In this regard, according to the eighth aspect of the invention, when the detection voltage value is more than or equal to a fourth predetermined voltage value larger than the third predetermined voltage value at the time of a start of the supply of the charging power, it can be decided that because of disconnection of a battery, a charging current does not flow and the fourth predetermined value or more is reached. Further, when the detection voltage value is less than the fourth predetermined value, a battery close to uncharging is connected, so that it can be decided that a current tends to flow and the battery is on charging.

According to the ninth aspect of the invention, connection and disconnection of a battery to and from the connecting unit can be decided more accurately.

According to the tenth and eleventh aspects of the invention, it can be decided whether a battery charged to a certain extent is connected to the connecting unit or a battery is in the other states (i.e., disconnection of a battery or connection of a battery on charging).

Further, unless a third predetermined voltage value is set at a sufficiently low value and a fourth predetermined voltage is set at a high value, a time restriction for making a determination since the switching unit shifted from OFF to ON becomes severe. In other words, if the third predetermined voltage value is set at 1.5 V and the fourth predetermined voltage is set at 2.0 V, the time taken to make a determination since the switching unit was turned on has only the amount of 0.5 V. Thus, it is necessary to decrease the third predetermined voltage value in order to relax the time restriction. In addition, when the fourth predetermined voltage is also set at a sufficiently high value, the time restriction can be further relaxed.

According to the eleventh aspect of the invention, a notification signal is supplied to a notification unit of a device in which, for example, a battery connection detecting device is provided, and a user can be notified of a state of a battery by the notification unit.

According to the twelfth aspect of the invention, a connection state of a battery can be detected by a simple structure in an image forming apparatus for storing data related to image formation of image data etc. using the battery and forming an image based on the stored image data. Further, a user can execute detection processing of battery connection when necessary by selecting a mode of executing detection processing by, for example, a battery connection detecting device by the setting unit.

According to a battery connection detecting device of the aspects of the invention, a connection state of a battery can be detected by a simple structure.

Exemplary Embodiments

Exemplary embodiments of the invention will now be described with reference to the drawings.

First Exemplary Embodiment (1) Image Forming Apparatus

Figure 2:
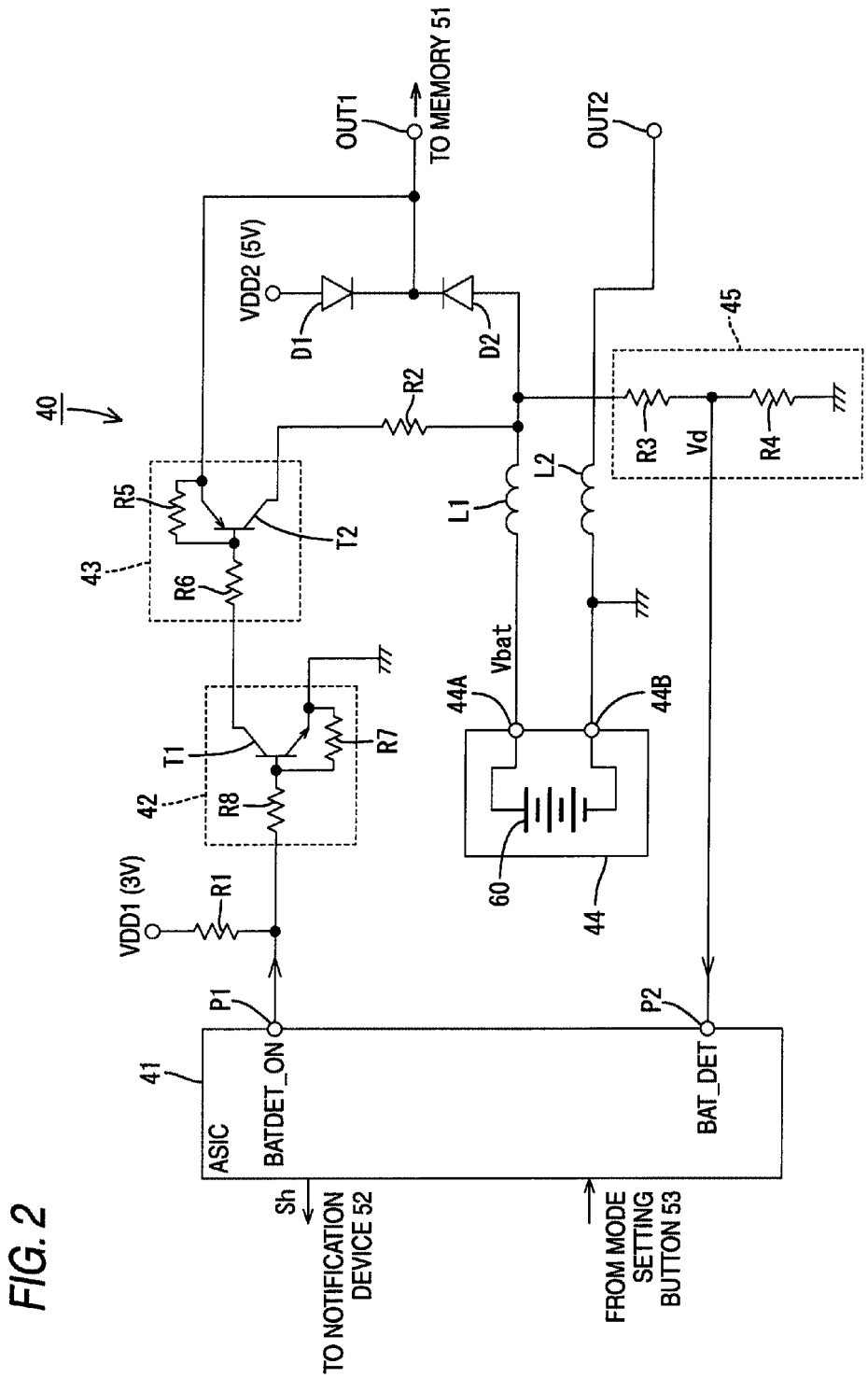
FIG. 2 is a schematic circuit diagram of a battery connection detecting device of the image forming apparatus.

A first exemplary embodiment of the invention will be described with reference to FIGS. 1 to 3.

An image forming apparatus 10 is, for example, a so-called direct tandem type color laser printer including four photosensitive drums 31, 32, 33, 34 corresponding to each of the colors of black, cyan, magenta, yellow and four developing rollers 36, 37, 38, 39. In addition, the front side shall indicate the right-side of FIG. 1 in the following description. Incidentally, the image forming apparatus 10 is not limited to the color laser printer. For example, a monochrome laser printer, a color LED or monochrome LED printer, or the so-called complex machine including a facsimile function and a copy function can be applied to the image forming apparatus 10.

The image forming apparatus 10 includes a body casing 11 formed in a box shape. A feeder unit 21, a circuit substrate 20, a sheet conveying part 23 for conveying a sheet, an image forming part 25 for printing and outputting image data on a sheet (recording medium) and a scanner part 27 are stacked sequentially from below and are provided in the body casing 11. The photosensitive drums 31, 32, 33, 34 and the developing rollers 36, 37, 38, 39, etc. are included in the image forming part 25.

A battery connection detecting device 40 and memory, for example, SDRAM (synchronous DRAM; one example of a retention unit) 51 are arranged on the circuit substrate 20, and a chargeable battery 60 is connected to the battery connection detecting device 40 and the SDRAM 51. Further, a voltage regulator (not shown) for stabilizing a battery voltage at a predetermined voltage is provided between the battery connection detecting device 40 and the SDRAM 51. The battery 60 is attached to a battery attachment part 44 (see FIG. 2) and is used as a power source for data retention of the image forming apparatus 10. Here, the battery 60 is used as, for example, a power source for retention of image data stored in the SDRAM 51.

The SDRAM 51 stores data related to image formation by electric power supplied from the battery 60 at the time of breaking a power source of the image forming apparatus 10. The image forming part 25 prints and outputs an image on a sheet using image data (i.e., at least a part of the stored data) stored in the SDRAM 51. Incidentally, the retention unit is not limited to the SDRAM 51. Any devices that require a backup power source in order to store the data related to image formation can be applied to the retention unit.

A polygon mirror (not shown) and four laser diodes (not shown) corresponding to each of the colors of black, cyan, magenta, yellow are built into the scanner part 27. Each of the laser lights L1 to L4 emitted from each of the laser diodes is deflected by the polygon mirror (not shown). Thereafter, a direction of each of the laser lights L1 to L4 is changed by an optical component such as a reflecting mirror installed on an optical path, and a surface of each of the photosensitive drums 31, 32, 33, 34 is irradiated with each of the laser lights by high-speed scanning as shown in FIG. 1. Consequently, an electrostatic latent image is formed on each of the photosensitive drums 31 to 34. Thereafter, it is constructed so that an image is formed on a sheet fed to a sheet conveying path G by passing through a developing step, a transfer step and fixing step and the sheet after the image formation is discharged on a sheet discharge tray provided in an upper surface wall 11A of the body casing 11.

A mode setting button (one example of a setting unit) 53 for setting a mode of executing processing of detection of connection to the battery attachment part 44 of the battery 60 by the battery connection detecting device 40 and the image forming apparatus 10 is provided in, for example, an operation panel (not shown) arranged on a surface of the body casing 11. When a mode of executing battery connection detection processing is selected by the mode setting button 53, a predetermined selection signal according to its mode is supplied from the operation panel to the battery connection detecting device 40. Therefore, a user can make the battery connection detecting device 40 execute the battery connection detection processing properly by setting the mode of executing the battery connection detection processing by the mode setting button 53 as necessary.

(2) Battery Connection Detecting Device

The battery connection detecting device 40 according to the first exemplary embodiment will be described with reference to FIGS. 2 and 3. FIG. 2 is a circuit diagram showing a circuit configuration of the battery connection detecting device 40, and FIG. 3 is a flowchart showing a flow according to battery connection detection of the battery connection detecting device 40. Herein, an example where the battery connection detecting device 40 is provided in the image forming apparatus 10 will be described.

The battery connection detecting device 40 includes an Application Specific Integrated Circuit (ASIC) (one example of a switching unit, a voltage detecting unit and a connection detecting unit) 41, a switch circuit (one example of a switching unit) 43, a battery attachment part (one example of a connecting unit) 44 and a voltage detecting circuit (one example of a voltage detecting unit) 45. Further, the battery connection detecting device 40 includes a voltage regulating circuit 42, a current limiting resistor R2, diodes (D1, D2) for backflow prevention, coils (L1, L2) for noise elimination, etc.

The ASIC 41 generates a BATDET_ON signal for controlling ON/OFF of the switch circuit 43, and supplies the BATDET_ON signal from a port P1 to the voltage regulating circuit 42. In addition, the ASIC 41 performs control of the scanner part 27 and the image forming part 25, etc., in order to form an image.

The voltage regulating circuit 42 includes a transistor T1 and two resistors (R7, R8). The voltage regulating circuit 42 is connected to the port P1 of the ASIC 41 and a power source terminal VDD1 via a resistor R1. A voltage of 3 V is supplied to the power source terminal VDD1. The transistor T1 is turned on or off by the BATDET_ON signal. That is, when the BATDET_ON signal is at a logic high level (i.e., 3 V), the transistor T1 is turned on and when the BATDET_ON signal is at a logic low level (i.e., ground level), the transistor T1 is turned off.

The switch circuit 43 is constructed of a transistor T2 and two resistors (R5, R6). One end of the resistor R6 is connected to a collector of the transistor T1 of the voltage regulating circuit 42 and the other end of the resistor R6 is connected to a base of the transistor T2. The resistor R5 is connected between an emitter and the base of the transistor T2. The emitter of the transistor T2 is connected to a first output terminal OUT1 and is also connected to a power source terminal VDD2 through the diode D1 for backflow prevention. A voltage of 5 V is supplied to the power source terminal VDD2. Further, a collector of the transistor T2 is connected to one end of the current limiting resistor R2. The current limiting resistor R2 is provided in order to limit a charging current in the case of charging the battery 60 and its resistance value is set at, for example, 100 Ω.

Here, the voltage regulating circuit 42 performs a function of an interface between different power source systems of a circuit of a power source system of 3 V and a circuit of a power source system of 5 V. Then, the transistor T2 of the switch circuit 43 is also turned on or off according to ON/OFF of the transistor T1 of the voltage regulating circuit 42. That is, the transistor T2 of the switch circuit 43 is turned on or off through the transistor T1 by the BATDET_ON signal. In addition, the reason why a power source of 5 V is herein used is because a charging voltage of the battery 60 having a battery voltage Vbat of, for example, a rated voltage of 3.6 V is ensured.

The other end of the current limiting resistor R2 is connected to one end of the coil L1 for noise elimination, an anode of the diode D2 for backflow prevention and the voltage detecting circuit 45. The other end of the coil L1 is connected to a first battery connection terminal 44A of the battery attachment part 44. The coil L2 for noise elimination is also connected between a second output terminal OUT2 and a second battery connection terminal 44B of the battery attachment part 44. The coil L1 and the coil L2 are means for preventing penetration of high-frequency noise into the battery 60.

The voltage detecting circuit 45 is a voltage dividing circuit made of a resistor R3 and a resistor R4, and detects a battery voltage value Vbat of the first battery connection terminal 44A of the battery attachment part 44. Here, resistance values of the resistor R3 and the resistor R4 are, for example, 100 kΩ and are equal, respectively.

Specifically, a point of connection between the resistor R3 and the resistor R4 is connected to a second port P2 of the ASIC 41, and the ASIC 41 receives a voltage Vd of the point of connection between the resistor R3 and the resistor R4 as a BAT_DET signal. That is, in the first exemplary embodiment, the battery voltage Vbat is not detected directly and detection is performed by the voltage Vd divided in one-half by the resistor R3 and the resistor R4. However, a "detection voltage value" in the invention has a relation corresponding to about twice a value of the voltage Vd always, so that detection of the voltage Vd herein corresponds to detection of the battery voltage Vbat. Therefore, the voltage (voltage value) Vd is described as the detection voltage (detection voltage value) Vd in the following description.

Then, the ASIC 41 switches a start or a stop of the supply of the charging power to the battery 60 connected to the battery attachment part 44 based on the detection voltage value Vd. Further, the ASIC 41 detects whether or not the battery 60 is connected to the battery attachment part 44 based on a comparison between at least one predetermined voltage value and at least any one of the detection voltage Vd after switching of the supply of the charging power and the detection voltage Vd before switching of the supply of the charging power by the switch circuit 43.

(3) Detection Processing of Battery Connection

Next, processing related to detection of battery connection by the battery connection detecting device 40 will be described with reference to the flowchart of FIG. 3. In addition, the case of turning on the transistor T2 of the switch circuit 43 when a power source of the image forming apparatus 10 is turned on is assumed in the first exemplary embodiment. That is, the first exemplary embodiment is in a state of applying a charging voltage of 5 V to the battery 60 before the switch circuit 43 is switched, that is, a state of supplying the charging power to the battery 60. The ASIC 41 executes processing related to detection of battery connection, for example, according to a predetermined program stored in memory (not shown) of the ASIC 41.

Figure 3:
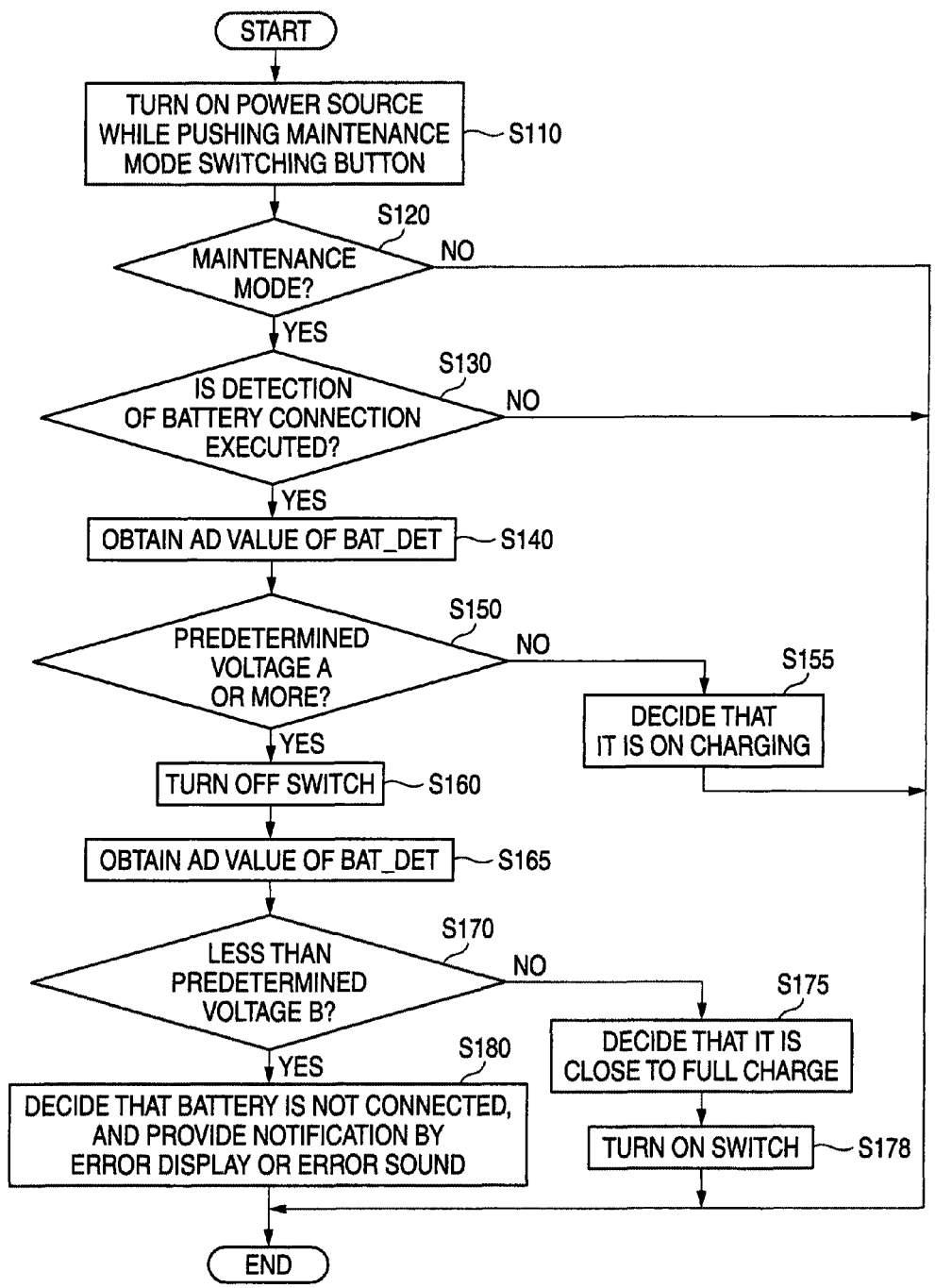
FIG. 3 is a flowchart showing battery connection detection processing in a first exemplary embodiment of the invention.

First, a user turns on a power source of the image forming apparatus 10 while pushing a maintenance mode setting button 53 which is the mode setting button of the image forming apparatus 10 in step S110 of FIG. 3. Then, the ASIC 41 determines whether or not to be in a maintenance mode at present in step S120.

If it is not in the maintenance mode at present (S120:NO), the present processing is ended. In contrast, if it is in the maintenance mode at present (S120:YES), it is determined whether or not detection of battery connection is executed in step S130. That is, it is determined whether or not a mode of executing the detection processing of battery connection is selected in the maintenance mode. If the detection of battery connection is not executed (S130:NO), the present processing is ended. In contrast, if the detection of battery connection is executed (S130:YES), the ASIC 41 receives a BAT_DET signal which is an analog signal, and makes AD conversion of the BAT_DET signal into a signal for internal processing, and obtains a digital value of the detection voltage Vd in step S140.

Next, the ASIC 41 determines whether or not the detection voltage Vd in the case of starting supply of charging power to the battery 60 is a predetermined voltage value A (which is one example of a "first predetermined voltage value", and which corresponds to one-half the "first predetermined voltage value" herein) or more in step S150. If it is determined that the detection voltage Vd is not the predetermined voltage value A or more (S150:NO), that is, the detection voltage Vd is less than the predetermined voltage value A, it is decided that the battery 60 is connected to the battery attachment part 44 and is on charging in step S155.

Here, the predetermined voltage value A is preferably set at a value corresponding to the detection voltage value Vd at the time when the battery 60 at the time of full charge in which the voltage becomes substantially constant is connected to the battery attachment part 44. That is, when the detection voltage value Vd is less than the predetermined voltage value A, a charging current to the battery 60 tends to flow, and thus it can suitably be decided that the battery 60, which is not charged too much, is connected. Further, the reason is because it can accurately be decided whether the battery 60 on charging is connected or the battery 60 is in the other states.

In contrast, if it is determined that the detection voltage Vd is the predetermined voltage value A or more in step S150 (S150:YES), the ASIC 41 supplies a BATDET_ON signal of a low level to the voltage regulating circuit 42 in order to switch the supply of the charging power to the battery 60 by the switch circuit 43 in step S160. Then, the transistor T2 of the switch circuit 43 is turned off and application of a charging voltage (5 V) to the battery 60, that is, the supply of the charging power is stopped. Then, in step S165, the ASIC 41 receives a BAT_DET signal and obtains a digital value of the detection voltage Vd in a manner similar to step S140.

Then, the ASIC 41 determines whether or not the detection voltage Vd in the case of stopping application of a charging voltage (5 V) is less than a predetermined voltage value B (which is one example of a "second predetermined voltage value", and which corresponds to one-half the "second predetermined voltage value" herein) in step S170. If it is determined that the detection voltage Vd is not less than the predetermined voltage value B (S170:NO), that is, the detection voltage Vd is the predetermined voltage value B or more, it is decided that the battery 60 is connected to the battery attachment part 44 and is in a state close to full charge in step S175. Then, the ASIC 41 supplies a BATDET_ON signal of a high level to the voltage regulating circuit 42 and turns on the transistor T2 of the switch circuit 43 in step S178. At this time, charging power is supplied to the battery 60.

Here, the predetermined voltage value B is a value smaller than the predetermined voltage value A. Further, the predetermined voltage value B is preferably set at a voltage value smaller than the minimum voltage value of the detection voltage value Vd at the time of connecting the uncharged battery 60 to the battery attachment part 44 at the time of a stop of the supply of the charging power to the battery 60 (the time of turning off the transistor T2). That is for the following reason.

That is, when the detection voltage value Vd is the predetermined voltage value A or more (i.e., a state in which a charging current resists flowing) in the case of setting the predetermined voltage value A lower than, for example, a voltage value of full charge of the battery, disconnection of the battery 60 or connection of the battery 60 close to full charge can be decided, but either the disconnection or the connection cannot be identified. Thus, when the detection voltage value Vd is more than or equal to the predetermined voltage value B smaller than the predetermined voltage value A after a stop of the supply of the charging power, it can be decided that electric power is supplied from the battery 60, so that it can be decided that the battery is connected and is close to full charge. This is because it can surely be decided that the battery is absent when the detection voltage value Vd at the time of the supply of the charging power is the predetermined voltage value A or more and the detection voltage value Vd at the time of a stop of the supply of the charging power is less than the predetermined voltage value B set at a voltage value smaller than the minimum voltage value of the detection voltage value Vd at the time of connecting the uncharged battery 60 to the battery attachment part 44 at the time of a stop of the supply of the charging power to the battery 60.

In addition, the predetermined voltage value A and the predetermined voltage value B are previously experimentally determined based on a leakage current at the time of OFF and a drop voltage at the time of ON of the transistor T2, a leakage current of the second port P2, element characteristics of a leakage current etc. of the diode D2, and the battery voltage Vbat, etc. Here, when a rated value of the battery voltage Vbat is 3.6 V, the predetermined voltage value A is set at, for example, 1.9 V (3.8 V as a first predetermined voltage value) and the predetermined voltage value B is set at, for example, 0.25 V (0.50 V as a second predetermined voltage value).

In contrast, if it is determined that the detection voltage Vd is less than the predetermined voltage value B in step S170 (S170:YES), the ASIC 41 decides that the battery 60 is not connected to the battery attachment part 44 as described above. Then, in step S180, a notification signal Sh for providing notification of battery disconnection (detection result) is generated and the notification signal Sh is supplied to a notification device 52. The notification device 52 notifies a user of the battery disconnection by, for example, error display or error sound. Therefore, the user can suitably know the battery disconnection.

According to the first exemplary embodiment, the presence or absence of connection of the battery 60 to the battery attachment part 44 is simply detected based on a comparison between the voltage value Vbat of the battery attachment part 44 at the time of the presence or absence of the supply of the charging power to the battery 60 switched by the switch circuit 43, that is, the detection voltage value Vd by a voltage detecting circuit and the corresponding predetermined voltage values (A, B). Therefore, the connection state of the battery 60 can be detected by a simple structure.

Further, not only the presence or absence of connection of the battery 60 to the battery attachment part 44 is detected but also it can be detected that the battery 60 is on charging and the battery 60 is close to full charge. That is, a charging state of the battery 60 can also be detected by a simple structure.

Still further, in the image forming apparatus 10 for storing data related to image formation of image data etc., using the battery 60 and forming an image based on the stored image data, a connection state of the battery 60 can be detected by a simple structure.

Second Exemplary Embodiment

A second exemplary embodiment of the invention will be described with reference to FIG. 4.

Incidentally, the second exemplary embodiment differs from the first exemplary embodiment in only processing related to battery connection detection of the battery connection detecting device 40. Thus, only the difference in the processing related to battery connection detection will be described below. Therefore, in FIG. 4, the same step numbers are assigned to the same processing as that of FIG. 3 of the first exemplary embodiment and its description is omitted. Further, the case of turning off a transistor T2 of a switch circuit 43 when a power source of an image forming apparatus 10 is turned on is assumed in the second exemplary embodiment. That is, the second exemplary embodiment is in a state in which a charging voltage of 5 V is not applied to a battery 60 before the switch circuit 43 is switched, that is, a state in which supply of the charging power to the battery 60 is stopped.

Figure 4:
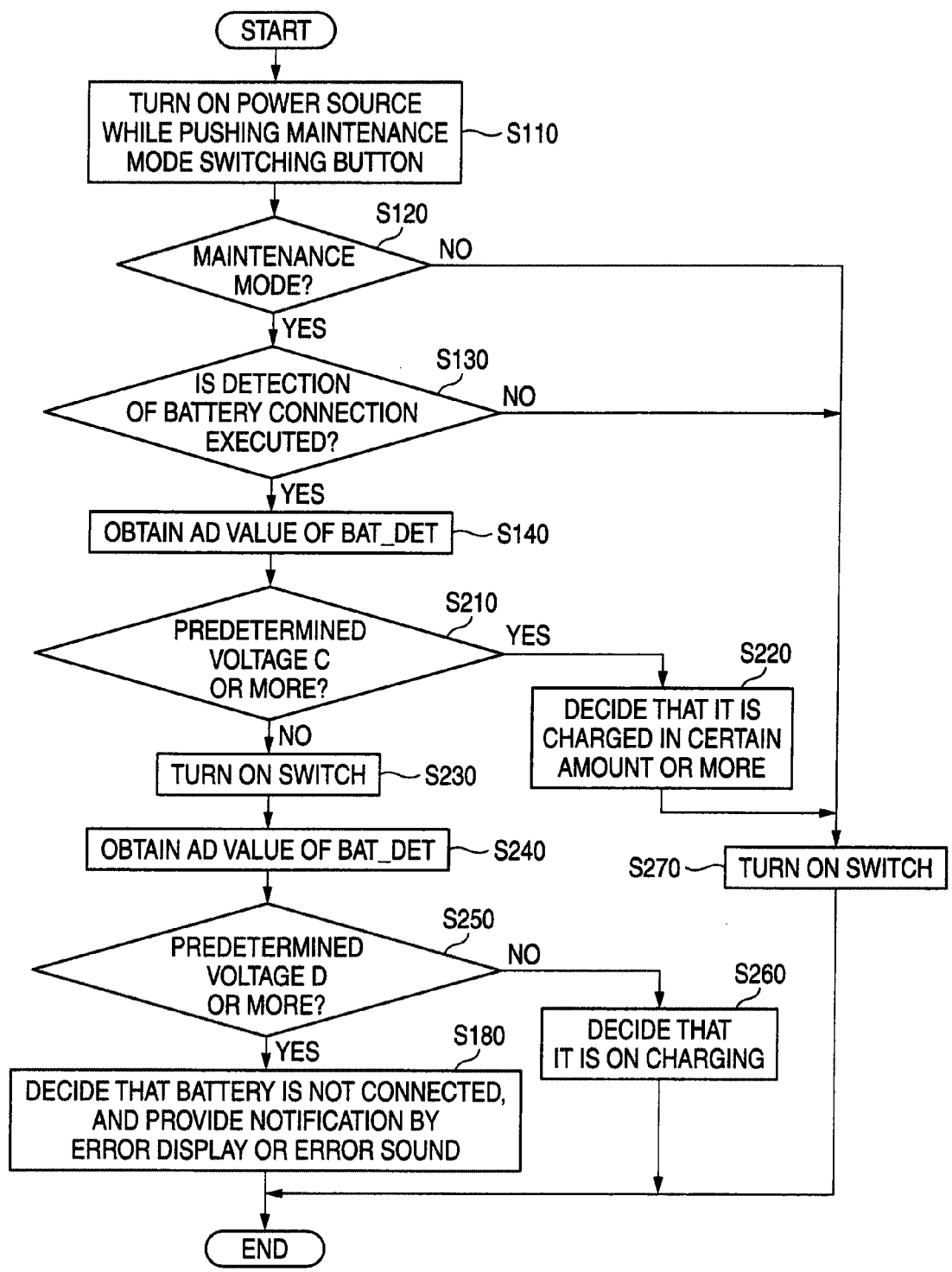
FIG. 4 is a flowchart showing battery connection detection processing in a second exemplary embodiment of the invention.

In step S210 of FIG. 4, an ASIC 41 determines whether or not a detection voltage Vd is a predetermined voltage value C (which is one example of a "third predetermined voltage value", and which corresponds to one-half the "third predetermined voltage value") or more. If it is determined that the detection voltage Vd is the predetermined voltage value C or more (S210:YES), it is decided that the battery 60 is connected to a battery attachment part 44 and is charged in a certain amount or more in step S220. Then, the ASIC 41 supplies a BATDET_ON signal of a high level to a voltage regulating circuit 42 and turns on the transistor T2 of the switch circuit 43 in step S270. At this time, charging power is supplied to the battery 60.

In contrast, if it is determined that the detection voltage Vd is not the predetermined voltage value C or more (S210:NO), that is, the detection voltage Vd is less than the predetermined voltage value C in step S210, the ASIC 41 supplies a BATDET_ON signal of a high level to the voltage regulating circuit 42 in order to switch the supply of the charging power to the battery 60 by the switch circuit 43 in step S230. Then, the transistor T2 of the switch circuit 43 is turned on, and a charging voltage (5 V) is applied to the battery 60. Then, the ASIC 41 makes AD conversion of a BAT_DET signal (detection voltage Vd) at the time of applying the charging voltage into a signal for internal processing, and obtains a digital value of the detection voltage Vd in step S240.

Then, the ASIC 41 determines whether or not the detection voltage Vd in the case of starting supply of charging power to the battery 60 is more than or equal to a predetermined voltage value D (which is one example of a "fourth predetermined voltage value", and which corresponds to one-half the "fourth predetermined voltage value") larger than the predetermined voltage value C in step S250. If it is determined that the detection voltage Vd is not the predetermined voltage value D or more (S250:NO), that is, the detection voltage Vd is less than the predetermined voltage value D, it is decided that the battery 60 is connected to the battery attachment part 44 and is on charging in step S260.

Here, the predetermined voltage value C is preferably set at the minimum voltage value of the detection voltage value Vd at the time of connecting the uncharged battery 60 to the battery attachment part 44 at the time of a stop of the supply of the charging power (the time of turning off the transistor T2). The predetermined voltage value D is preferably set at a voltage value which is smaller than the minimum voltage value of the detection voltage value Vd at the time when the battery 60 is not connected to the battery attachment part 44 at the time of the supply of the charging power (the time of turning on the transistor T2) and in which a difference from the predetermined voltage value C becomes a predetermined voltage difference or more. That is for the following reason.

That is, unless the predetermined voltage value C is set at a sufficiently low value and the predetermined voltage value D is set at a high value, a time restriction for making a determination since the switch circuit 43 shifted from OFF to ON becomes severe. In other words, if the predetermined voltage value C is set at 1.5 V and the predetermined voltage value D is set at 2.0 V, the time taken to make a determination since the switch circuit 43 was turned on has only the amount of 0.5 V. Thus, it is necessary to decrease the predetermined voltage value C in order to relax the time restriction. Further, when the predetermined voltage value D is set at a sufficiently high value in which the difference from the predetermined voltage value C is the predetermined voltage difference or more, the time restriction can be further relaxed.

It is necessary to set the predetermined voltage value C at a sufficiently low value. Incidentally, if the predetermined voltage value C is set at a value lower than the minimum voltage value of the detection voltage value Vd at the time of connecting the uncharged battery 60 to the battery attachment part 44 at the time of a stop of the supply of the charging power, it may be decided that the battery 60 is connected to the battery attachment part 44 though the battery 60 is not connected to the battery attachment part 44. Therefore, the predetermined voltage value C is set at the minimum voltage value of the detection voltage value Vd at the time of connecting the uncharged battery 60 to the battery attachment part 44 at the time of the stop of the supply of the charging power.

It is necessary to set the predetermined voltage value D at a sufficiently high value. Incidentally, if the predetermined voltage value D is set at a value higher than the minimum voltage value of the detection voltage value Vd at the time when the battery 60 is not connected to the battery attachment part 44 at the time of the supply of the charging power, it may be decided that the battery 60 is connected to the battery attachment part 44 though the battery 60 is not connected to the battery attachment part 44. Therefore, the predetermined voltage value D is set at a voltage value smaller than the minimum voltage value of the detection voltage value Vd at the time when the battery 60 is not connected to the battery attachment part 44 at the time of the supply of the charging power.

In addition, the predetermined voltage value C, the predetermined voltage value D and the predetermined voltage difference are previously determined by experiment in a manner similar to the predetermined voltage value A and the predetermined voltage value B. Here, when a rated value of the battery voltage Vbat is 3.6 V, the predetermined voltage value C is set at, for example, 0.25 V (0.5 V as a third predetermined voltage value) and the predetermined voltage value D is set at, for example, 1.9 V (3.8 V as a fourth predetermined voltage value) and the predetermined voltage difference is set at, for example, 1.6 V.

In contrast, if it is determined that the detection voltage Vd is the predetermined voltage value D or more in step S250 (S250:YES), the ASIC 41 decides that the battery 60 is not connected to the battery attachment part 44, and notifies a user of battery disconnection by, for example, error display or error sound through a notification device 52 in step S180 in a manner similar to the first exemplary embodiment.

Therefore, an effect similar to the first exemplary embodiment can also be obtained in the second exemplary embodiment as described above. That is, a connection state of the battery 60 can be detected by a simple structure and also a charging state of the battery 60 can be detected by the simple structure.

Other Exemplary Embodiments

The invention is not limited to the above-described exemplary embodiments. For example, following exemplary embodiments may be included in the technical scope of the invention.

In the above-described exemplary embodiments, the example of notifying a user of only battery disconnection has been shown. Alternatively, it may be configured so as to notify a user of battery connection. For example, it may be constructed so as to add processing for notifying a user of battery connection through the notification device 52 after step S155 and step S175 of FIG. 3 and after step S220 and step S260 of FIG. 4.

In the above-described exemplary embodiments, the example of disposing the battery connection detecting device 40 in the image forming apparatus 10 which is one example of an image forming apparatus has been shown, but is not limited to this. Alternatively, the battery connection detecting device 40 can also be used in other image forming apparatus such as an LED printer, for example.

In the first exemplary embodiment, the processing from step S160 to step S180 after step S155 in FIG. 3 may be omitted when it could be only detected that the battery 60 on charging is connected to the battery attachment part 44.

In the second exemplary embodiment, the processing of step S180 and the processing from step S230 to step S260 after step S220 in FIG. 4 may be omitted when it could be only detected that the battery 60 charged in a certain amount or more is connected to the battery attachment part 44.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A battery connection detecting device comprising:
   a connecting unit, to which a battery is connected;
   a voltage detecting unit that detects a voltage value of the connecting unit, the voltage value detected by the voltage detecting unit being a detection voltage value;
   a switching unit that switches supply of charging power to the battery connected to the connecting unit based on the detection voltage value; and
   a connection detecting unit that compares at least one predetermined voltage value with at least one of the detection voltage value before the switching unit switches the supply of the charging power and the detection voltage value after the switching unit switches the supply of the charging power in order to detect whether or not the battery is connected to the connecting unit.

2. The battery connection detecting device according to claim 1, wherein, when the detection voltage value at a time of supplying the charging power before the switching unit switches the supply of the charging power is less than a first predetermined voltage value, the connection detecting unit detects that the battery is connected to the connecting unit.

3. The battery connection detecting device according to claim 1,
   wherein, when the detection voltage value at a time of supplying the charging power before the switching unit switches the supply of the charging power is more than or equal to a first predetermined voltage value, the switching unit stops the supply of the charging power,
   wherein, when the detection voltage value at a time after the supply of the charging power is stopped is more than or equal to a second predetermined voltage value, which is smaller than the first predetermined voltage value, the connection detecting unit detects that the battery is connected to the connecting unit, and
   wherein, when the detection voltage value at the time after the supply of the charging power is stopped is less than the second predetermined voltage value, the connection detecting unit detects that the battery is not connected to the connecting unit.

4. The battery connection detecting device according to claim 3, wherein the second predetermined voltage value is set to a voltage value that is smaller than a minimum voltage value of the detection voltage value at a time when an uncharged battery is connected to the connecting unit after the supply of the charging power is stopped.

5. The battery connection detecting device according to claim 2, wherein the first predetermined voltage value is set to a value corresponding to the detection voltage value at a time of connecting a full-charged battery having a substantially constant voltage to the connecting unit.

6. The battery connection detecting device according to claim 3, wherein the first predetermined voltage value is set to a value corresponding to the detection voltage value at a time of connecting a full-charged battery having a substantially constant voltage to the connecting unit.

7. The battery connection detecting device according to claim 1, wherein, when the detection voltage value at a time of stopping the supply of the charging power before the switching unit switches the supply of the charging power is more than or equal to a predetermined voltage value, the connection detecting unit detects that the battery is connected to the connecting unit.

8. The battery connection detecting device according to claim 1, wherein, when the detection voltage value at a time of stopping the supply of the charging power after the switching unit switches the supply of the charging power is less than a first predetermined voltage value, the switching units starts the supply of the charging power,
   wherein, when the detection voltage value at a time after the supply of the charging power is started is more than or equal to a second predetermined voltage value, which is larger than the first predetermined voltage value, the connection detecting unit detects that the battery is not connected to the connecting unit, and
   wherein, when the detection voltage value at the time after the supply of the charging power is started is less than the second predetermined voltage value, the connection detecting unit detects that the battery is connected to the connecting unit.

9. The battery connection detecting device according to claim 8, wherein the second predetermined voltage value is set to a voltage value, which is smaller than a minimum voltage value of the detection voltage value at a time when the battery is not connected to the connecting unit after the supply of the charging power is started, and which is more than or equal to a predetermined voltage difference from the first predetermined voltage value.

10. The battery connection detecting device according to claim 7, wherein the predetermined voltage value is set to a minimum voltage value of the detection voltage value at a time of connecting an uncharged battery to the connecting unit when the supply of the charging power is stopped.

11. The battery connection detecting device according to claim 8, wherein the first predetermined voltage value is set to a minimum voltage value of the detection voltage value at a time of connecting an uncharged battery to the connecting unit when the supply of the charging power is stopped.

12. The battery connection detecting device according to claim 1, wherein the connection detecting unit generates a notification signal for notifying a detection result thereof.

13. An image forming apparatus comprising:
   a battery;
   a battery connection detecting device, which detects a connection state of the battery, and which comprises:
      a connecting unit, to which the battery is connected;
      a voltage detecting unit that detects a voltage value of the connecting unit, the voltage value detected by the voltage detecting unit being a detection voltage value;
      a switching unit that switches supply of charging power to the battery connected to the connecting unit based on the detection voltage value; and
      a connection detecting unit that compares at least one predetermined voltage value with at least one of the detection voltage value before the switching unit switches the supply of the charging power and the detection voltage value after the switching unit switches the supply of the charging power in order to detect whether or not the battery is connected to the connecting unit;

a storage unit, which is connected to the battery, and which stores data related to image formation by electric power supplied from the battery;

an image forming unit that forms an image on a recording medium using at least a part of the data; and a setting unit that sets a mode of executing detection processing by the battery connection detecting device.

* * * * *